Patented Oct. 13, 1942

2,298,383

UNITED STATES PATENT OFFICE 2,298,383

TREATMENT OF HYDROCARBONS

Vladimir N. Ipatieff and Herman Pines, Chicago, Ill., assignors to Universal Oil Products Company, Chicago, Ill., a corporation of Delaware No Drawing. Application October 7, 1940, Serial No. 360,132

12 Claims. (Cl. 196—10)

This application is a continuation-in-part of our co-pending application Serial No. 339,489 filed June 8, 1940, and of application Ser. No. 268,346, now Patent No. 2,236,099, which is in turn a continuation-in-part of application Ser. No. 35,237, filed August 8, 1935.

The invention relates to the treatment of an isoparaffin hydrocarbon to produce higher molecular weight alkyl derivatives thereof. More specifically the process is concerned with a method for alkylating isobutane by ethylene in the presence of a particular type of catalyst to produce a motor fuel of relatively high antiknock value.

In one specific embodiment the present invention comprises a process for alkylating isobutane by ethylene in the presence of a hydrogen halide and of a composite of aluminum chloride and a substantially inert carrier.

In a further embodiment the present invention comprises a process for producing a substantially saturated hydrocarbon fraction of motor fuel boiling range which comprises subjecting an isobutane-containing hydrocarbon fraction and a gas mixture containing ethylene to contact under alkylating conditions of temperature and pressure in the presence of a composite of aluminum chloride and a substantially inert porous carrier.

In effecting alkylation of isobutane by ethylene in the presence of unsupported aluminum chloride, intermediate compounds of a metallo-organic nature are frequently formed which possess fluid or semi-fluid properties and subsequently result in a running-together of the original particles of catalyst so that less surface is exposed and the speed of the reaction is diminished. Frequently during use in hydrocarbon alkylation reactions, originally finely divided and granular anhydrous aluminum chloride becomes transformed into a more or less sticky and pasty material which has a greatly diminished catalytic activity and is difficult to treat for the recovery of the aluminum chloride.

A property of anhydrous aluminum chloride which must be taken into account is its tendency to sublime at approximately 180° C., so that if it is employed at temperatures above this point, it must ordinarily be injected or sublimed into the reaction zone. In the process of the present invention in which the aluminum chloride employed is strongly adsorbed by granular material, both of the disadvantages enumerated are to a large extent overcome since the tendency of the chloride to volatilize is counteracted partially by the adsorbent action of the supports employed and these supports further act to adsorb and retain some of the viscous addition compounds and prevent the composite catalyst granules from adhering to form large agglomerates.

A general method of preparation of the types of composite catalyst granules whose use in the alkylation of isobutane by ethylene characterizes the present invention consists in mixing aluminum chloride and a granular supporting material in an apparatus which will withstand some pressure and then in heating under elevated temperatures and pressures until the aluminum chloride has been adsorbed into the pores of the support.

Supporting materials which may be utilized in the preparation of the present type of alkylating catalysts comprise various types of activated carbon, diatomaceous earth, silica, alumina, magnesia, magnesite, crushed firebrick, aluminum silicates, porcelain, clays, fuller's earth, bentonite, montmorillonite, etc., and in general refractory porous substances which have substantially no reactivity with anhydrous aluminum chloride.

Another advantage of using a supported catalyst lies in the fact that aluminum chloride is diluted by the carrier and, therefore, the reaction catalyzed is less energetic than that which would occur in the presence of unsupported aluminum chloride, and consequently the destructive alkylating tendency of unsupported aluminum chloride to decompose the alkylation product, especially at temperatures of 50° C. and higher, is substantially avoided.

The proportions of adsorbent carrier and aluminum chloride may be varied as desired to make catalyst composites of different activities. It has been found possible and practical in the case of aluminum chloride to make stable granular catalysts resistant to disintegrating influence by using up to approximately one part by weight of anhydrous aluminum chloride per part by weight of adsorptive support or carrier. These materials, after thorough mechanical mixing in the desired proportion, may be placed in a pressure vessel which is preferably made of or lined with suitable corrosion resistant material, the vessel is placed under a pressure of approximately 25 atmospheres by the introduction of hydrogen or of another inert gas, and then the vessel and contents are heated at approximately 250° C. for several hours. Hydrogen chloride may also be added, if desired, prior to the heating either in the presence or absence of an added gas as hydrogen.

After such a treatment of the original mixture, a product is obtained in the form of a dry granular composite of aluminum chloride and carrier. From the appearance of the composite, the aluminum chloride seems to have disappeared although it is actually in the pores and on the surface of the adsorbent as evidenced by the violent reaction of the granules of the composite with water and the catalytic activity in organic reactions. This procedure is typical of the preparation of a number of similar catalysts using different combinations of the metal chloride on the supports already mentioned.

The term "activated carbon" as used in the present specification is intended to include any type of prepared carbon or carbonaceous material which is more or less granular and possessed of good porosity and structural strength and which has been prepared by general steps involving the leaching of adsorbed materials from granular residual carbonaceous materials such as wood char and various varieties of coke by mineral acids and by the controlled heating, preferably under vacuum, to expel adsorbed liquids and gases. It is recognized that various forms of active granular chars will vary considerably in adsorptive capacity and therefore the properties of catalysts prepared from them in accordance with the present invention will vary both in respect to the amount of aluminum chloride which they are able to adsorb and in respect to the periods of service in which the catalysts are able to maintain a practical alkylating activity.

It is proposed to carry out the alkylation of isobutane by ethylene in the presence of supported aluminum chloride at a temperature within the approximate limits of −25 and 200° C. and under a pressure of from substantially atmospheric to approximately 1000 pounds per square inch. In the hydrocarbon mixture subjected to alkylation it is preferable to have present 3 or more molecular proportions of isoparaffin per molecular proportion of olefinic hydrocarbon. A small quantity of hydrogen chloride is preferably added, generally to the extent of approximately 0.5–15% by weight of the total hydrocarbon mixture subjected to contact with the alkylating catalyst. It is also recommended to have hydrogen present in the reaction mixture, generally in a quantity of not more than 10 mole per cent of the total hydrocarbons.

The process of alkylating isobutane by ethylene may be carried out using either batch or continuous operation. Thus in batch type operation a suspension of an aluminum chloride-carrier composite is made in isobutane or in an isobutane-containing hydrocarbon mixture which is agitated in treaters preferably in the presence of hydrogen and hydrogen chloride until the alkylation reaction reaches completion. If desired, a portion of the alkylation product may be commingled with the mixture of isobutane and catalyst being contacted with ethylene to effect alkylation.

Alternatively the mixture of hydrocarbons and catalyst suspended therein may be passed through a tortuous path in some type of baffled mixer to accomplish the same results. The particular conditions of temperature and pressure to be employed in such an alkylating treating of isobutane will vary with the proportion of ethylene, the activity of the catalyst composite, and other factors.

Similarly the alkylation treatment may be carried out by continuously passing the mixture containing both isobutane and ethylene through a fixed section of the granular aluminum chloride-containing catalyst contained in a tube or tower or in a plurality of such reactors maintained under the desired operating conditions to produce a substantially saturated alkylate of motor fuel boiling range containing a substantial proportion of branched chain hexanes and having a high octane number and good lead susceptibility.

The following examples are introduced as characteristic of the practical operation of the present process although they are not presented with the intention of limiting the scope of the invention in exact correspondence with the numerical data since some latitude is possible in the proportions of adsorbent to aluminum chloride, and temperature and pressure may be varied also within the limits hereinabove set forth:

EXAMPLE I

A mixture of 8 molecular proportions of isobutane and 1 molecular proportion of ethylene was subjected to contact with a composite comprising essentially 25% by weight of aluminum chloride and 75% by weight of formed particles of diatomaceous earth, commercially termed granular "celite," under a pressure of 400 pounds per square inch. The following results were obtained when the ethylene-isobutane mixture was charged at a liquid space velocity of 5.4 and in the presence of about 0.17 g. of hydrogen chloride per hour per gram of aluminum chloride contained in the catalyst:

| Reaction temperature, °C | 7 | 38 | 50 | 66 | 91 |
|---|---|---|---|---|---|
| Liquid product yield, percent by weight of ethylene charged | 128 | 213 | 207 | 238 | 317 |
| Hexane boiling range hydrocarbons, mol percent | 66 | 72 | 76 | 78 | 45 |
| Chlorine content, percent by weight | 0.95 | 0.46 | 0.28 | 0.03 | 0.00 |

The above results indicated that considerable polymerization occurred at a temperature of 7° C. and that a temperature of approximately 38° C. was required for efficient alkylation of isobutane by ethlyene. The chlorine content of the alkylation product decreased with increasing temperature of reaction. However, above about 66° C. autodestructive alkylation diminished the hexane fraction and increased the production of pentanes. The total alkylation product formed at 66° C. boiled in the range of aviation gasoline and had an octane number of 86.5 while selected portions of the hexane fraction had an octane number of 92. The total alkylation product contained 80% by volume of hexanes and small amounts of lower boiling and higher boiling paraffins. Experimental results indicate that 50% of the total product is 2,3-dimethyl butane, a hydrocarbon with an octane number of 94 as determined by the motor method.

EXAMPLE II

A mixture containing approximately 10 mole per cent of ethylene in isobutane was passed through a reactor containing a composite of 24 parts by weight of aluminum chloride and 36 parts by weight of granular celite maintained at 60° C. under a pressure of 400 pounds per square inch and in the presence of 0.1 g. of hydrogen chloride per hour per gram of aluminum chloride contained in the catalyst, an amount corresponding to 0.04 g. of hydrogen chloride per gram of olefin charged. During a run of ½ hour at a liquid space velocity of 20.8, a saturated product was obtained in an amount equivalent to 197% by weight of the ethylene charged, and consisted of 8% by volume of pentanes, 70% hexanes, 4% heptanes, and 18% of higher boiling paraffinic hydrocarbons.

EXAMPLE III

An isobutane-ethylene alkylation was made at a liquid space velocity of 10.7 but otherwise under the same conditions used in Example II. A saturated liquid hydrocarbon product formed in an amount equivalent to 226% by weight of ethylene charged, contained 0.2% by weight of chlorine and consisted of 6% by volume of pentanes, 74% hexanes, 3% heptanes, and 17% of octanes and nonanes.

EXAMPLE IV

A hydrocarbon mixture consisting of 9 mole per cent of ethylene in isobutane was passed at a liquid space velocity of 4 through a reactor containing a composite of 20% by weight of aluminum chloride and 72% by weight of "celite" maintained at 60° C. under a pressure of 400 pounds per square inch. In a run of 44 hours duration, 11.2 gallons of a normally liquid hydrocarbon product was obtained per pound of aluminum chloride contained in the catalyst. The liquid product, which had a bromine number of 0, contained 71% by volume of hexanes and 0.01% by weight of chlorine.

EXAMPLE V

Isobutane, ethylene, and hydrogen chloride were subjected to contact with a supported aluminum chloride catalyst under essentially the vapor phase conditions indicated in Table I with the results shown therein.

TABLE I

*Alkylation of isobutane with ethylene in the presence of supported aluminum chloride and hydrogen chloride*

| Run No. | 1 | 2 | 3 | 4 | 5 |
|---|---|---|---|---|---|
| Temperature, °C | 63 | 63 | 63 | 65 | 77 |
| Pressure, lbs./in.² | 100 | 100 | 100 | 200 | 200 |
| Catalyst support | (1) | (2) | (3) | (3) | (3) |
| Aluminum chloride content of catalyst, weight percent | 31 | 32 | 17 | 17 | 17 |
| Length of run, hours | 47 | 63 | 16 | 19 | 8 |
| Composition of charge, mol percent: | | | | | |
| Ethylene | 11.8 | 9.9 | 11.8 | 9.7 | 10.2 |
| Isobutane | 82.9 | 88.1 | 85.8 | 89.1 | 87.9 |
| Hydrogen chloride | 5.3 | 2.0 | 2.4 | 1.2 | 1.9 |
| Liquid space velocity of charge | 0.5 | 0.5 | 1.0 | 5 | 4 |
| Alkylation product, percent by weight of ethylene charged | 310 | 250 | 197 | 70 | 233 |
| Hexane content, volume percent | 38 | 58 | 64 | 62 | 53 |
| Chlorine content of hexane fraction | 0.01 | 0.015 | 0.014 | 0.03 | 0.03 |

1 Celite.
2 Pumice.
3 Alumina.

In the runs at about 63° C. the reaction of ethylene with isobutane proceeded readily in the vapor phase over a composite catalyst consisting of aluminum chloride supported on pumice or celite. Catalysts comprising essentially aluminum chloride supported by alumina or, in other runs, charcoal, gave only partial alkylation under the same conditions of operation. At a higher temperature, namely 77° C., complete alkylation occurred in the presence of an aluminum chloride-alumina catalyst as shown by the absence of ethylene in the exit gas as well as by the improved yield of alkylation product with a relatively higher chlorine content than was present in the alkylation products formed at 63° C.

The character of the present invention and its value are evident from the foregoing specification and examples introduced, although neither section is intended to unduly limit its generally broad scope.

We claim as our invention:

1. A process for producing substantially saturated hydrocarbons of motor fuel boiling range and high antiknock value which comprises subjecting a mixture of isobutane and ethylene to contact under alkylating conditions with a composite of aluminum chloride and a substantially inert granular carrier in the presence of a hydrogen halide.

2. A process for producing a substantially saturated hydrocarbon fraction of motor fuel boiling range and high antiknock value which comprises subjecting a mixture of a major proportion of isobutane, a minor molecular proportion of ethylene, and a relatively small amount of a hydrogen halide to contact under alkylating conditions of temperature and pressure with a composite of anhydrous aluminum chloride and a substantially inert carrier.

3. A process for producing a substantially saturated hydrocarbon fraction of motor fuel boiling range and high antiknock value which comprises subjecting a mixture of a major proportion of isobutane, a minor molecular proportion of ethylene, and a relatively small amount of a hydrogen halide to contact at a temperature between about −25° and about 200° C. with a composite of anhydrous aluminum chloride and a substantially inert carrier.

4. A process for producing a substantially saturated hydrocarbon fraction of motor fuel boiling range and high antiknock value which comprises subjecting a mixture of a major proportion of isobutane, a minor molecular proportion of ethylene, and a relatively small amount of a hydrogen halide to contact at a temperature between about −25° and about 200° C. under a pressure of from substantially atmospheric to approximately 1000 pounds per square inch with a composite of anhydrous aluminum chloride and a substantially inert carrier.

5. A process for producing a substantially saturated hydrocarbon fraction of motor fuel boiling range and high anti-knock value which comprises subjecting one molecular proportion of ethylene and at least 3 molecular proportions of isobutane to contact at a temperature between about −25° and about 200° C. under a pressure of from substantially atmospheric to approximately 1000 pounds per square inch in the presence of hydrogen, a hydrogen halide, and a composite of anhydrous aluminum chloride with a substantially inert carrier.

6. A process for producing a substantially saturated hydrocarbon fraction of motor fuel boiling range and high antiknock value which comprises subjecting one molecular proportion of ethylene and at least 3 molecular proportions of isobutane to contact at a temperature between about −25° and about 200° C. under a pressure of from substantially atmospheric to approximately 1000 pounds per square inch in the presence of between about 0.5 and about 15% by weight of hydrogen chloride and a composite of anhydrous aluminum chloride with a substantially inert carrier.

7. A process for producing a substantially saturated hydrocarbon fraction of motor fuel boiling range and high antiknock value which comprises subjecting one molecular proportion of ethylene and at least 3 molecular proportions of isobutane to contact at a temperature between about −25° and about 200° C. under a pressure of from substantially atmospheric to approximately 1000 pounds per square inch in the presence of between about 0.5 and about 15% by weight of hydrogen chloride and a composite of anhydrous aluminum chloride adsorbed in a substantially siliceous adsorbent.

8. A process for producing a substantially saturated hydrocarbon fraction of motor fuel boiling range and high antiknock value which comprises subjecting one molecular proportion of ethylene and at least 3 molecular proportions of isobutane to contact at a temperature between about −25° and about 200° C. under a pressure of from substantially atmospheric to approximately 1000 pounds per square inch in the presence of between about 0.5 and about 15% by weight of hydrogen chloride and a composite of anhydrous aluminum chloride adsorbed in alumina.

9. A process for producing a substantially saturated hydrocarbon fraction of motor fuel boiling range and high antiknock value which comprises subjecting one molecular proportion of ethylene and at least 3 molecular proportions of isobutane to contact at a temperature between about −25° and about 200° C. under a pressure of from substantially atmospheric to approximately 1000 pounds per square inch in the presence of between about 0.5 and about 15% by weight of hydrogen chloride and a composite of anhydrous aluminum chloride adsorbed in activated carbon.

10. A process for producing a substantially saturated hydrocarbon fraction of motor fuel boiling range and high antiknock value which comprises subjecting a mixture of one molecular proportion of ethylene and at least 3 molecular proportions of isobutane to contact with a composite of anhydrous aluminum chloride adsorbed in a solid adsorbent at a temperature between about −25° and about 200° C. under a pressure of from substantially atmospheric to approximately 1000 pounds per square inch in the presence of between about 0.5 and about 15% by weight of hydrogen chloride and of less than about 10 mole per cent of hydrogen based upon the total hydrocarbons present in the reaction mixture.

11. A process for producing a substantially saturated hydrocarbon fraction of motor fuel boiling range and high antiknock value which comprises subjecting a major proportion of a butane mixture, containing a substantial proportion of isobutane, and a minor molecular proportion of ethylene relative to the isobutane present in said butane mixture to contact with a composite of anhydrous aluminum chloride adsorbed in a solid adsorbent at a temperature between about −25° and about 200° C. under a pressure of from substantially atmospheric to approximately 1000 pounds per square inch in the presence of between about 0.5 and about 15% by weight of hydrogen chloride and of less than about 10 mole per cent of hydrogen based upon the total hydrocarbons present in the reaction mixture.

12. A process for producing substantially saturated hydrocarbons of motor fuel boiling range and high antiknock value which comprises alkylating isobutane with ethylene in the presence of hydrogen chloride and a solid composite comprising aluminum chloride adsorbed in a solid adsorbent.

VLADIMIR N. IPATIEFF.
HERMAN PINES.